United States Patent [19]

Ishikawa et al.

[11] Patent Number: 4,739,002
[45] Date of Patent: Apr. 19, 1988

[54] CURABLE ACRYLIC ADHESIVES

[75] Inventors: Hikaru Ishikawa, Kokubunji; Toshio Honda, Akigawa; Kazuo Naito, Kawasaki; Yukio Fukuura, Kawagoe, all of Japan

[73] Assignee: Bridgestone Corporation, Tokyo, Japan

[21] Appl. No.: 875,101

[22] Filed: Jun. 17, 1986

[30] Foreign Application Priority Data

Jun. 18, 1985 [JP] Japan .................. 60-132173

[51] Int. Cl.$^4$ .................. C08L 33/08; C08L 33/10; C08L 51/04; C08L 93/04
[52] U.S. Cl. .................. 524/270; 524/271; 524/272; 524/273; 525/54.44; 525/68; 525/139; 525/193; 525/289; 525/292; 525/301; 525/302; 525/98
[58] Field of Search .................. 525/54.44, 68, 193, 525/139, 289, 292, 301, 302, 98; 524/270

[56] References Cited

U.S. PATENT DOCUMENTS

| | | | |
|---|---|---|---|
| 4,117,036 | 9/1978 | Honda et al. | 524/443 |
| 4,338,415 | 7/1982 | Acharya et al. | 525/193 |
| 4,338,416 | 7/1982 | Acharya et al. | 525/193 |
| 4,591,618 | 5/1986 | Naito et al. | |

FOREIGN PATENT DOCUMENTS

| | | | |
|---|---|---|---|
| 2345392 | 3/1975 | Fed. Rep. of Germany | 525/193 |
| 57-159864 | 3/1981 | Japan. | |

*Primary Examiner*—Allan M. Lieberman
*Attorney, Agent, or Firm*—Birch, Stewart, Kolasch & Birch

[57] ABSTRACT

Cross-linking type adhesive compositions comprising (A) polymers having $\alpha,\beta$-unsaturated carboxylate groups, (B) materials having polymerizable vinyl groups, which contain an acrylic and/or methacrylic acid, (C) thermoplastic resins and (D) catalysts of organic peroxides and/or photosensitizers. The adhesive compositions have good adhesive properties together with an excellent heat aging resistance, and can be applied for adhesion to organic and inorganic substrates.

7 Claims, No Drawings

CURABLE ACRYLIC ADHESIVES

BACKGROUND OF THE INVENTION

The present invention relates to novel curable adhesive compounds, and more particularly to adhesive compounds which have an excellent adhesive strength to adherends made of organic or inorganic materials, and which have good heat aging resistance.

In recent years, a number of so-called second generation acrylic adhesives (hereinafter called "SGA") mainly composed of rubber-like polymers of acrylates or methacrylates have been introduced. These types of adhesives are characterized by the fact that there is no longer a need to weigh and mix two components as in the case of epoxy resin adhesives, and that they have high shear bond strength together with high impact resistance due to the content of the rubber component.

However, conventional SGAs have poor adhesive retention strength at high temperatures, heat aging resistance, fatigue resistance and particularly poor peel bond strength. Many problems could be solved by applying the adhesives to parts or portions where such properties are required. In particular, with respect to conventional SGAs and epoxy resin adhesives, it is quite difficult to increase the peel bond strength without any reduction of the shear bond strength.

SUMMARY OF THE INVENTION

It is an object of this invention to provide novel adhesive compounds which are an improvement over existing adhesives and which have high shear bond strength and high peel bond strength together with excellent adhesive retention strength at high temperatures, heat aging resistance and fatigue resistance.

It is another object of the invention to provide adhesive compounds which can be suitably applied to various organic and inorganic adherends, such as various metals, plastics, FRPs, glasses and ceramics. Other objects and advantages of the invention will be apparent from the following description.

The above objects can be achieved by the present invention. According the present invention, there is provided an adhesive composition which comprises (A) at least one polymer having an α,β-unsaturated carboxylate group, (B) a polymerizable vinyl group-bearing material containing an acrylic and/or methacrylic acid as an essential component, (C) a thermoplastic resin and (D) a catalyst.

More particularly, the adhesive composition is of the cross-linking type, which comprises the four essential components (A), (B), (C) and (D) indicated above. The component (A) is comprised of one or more of polymers selected from polymers having α,β-unsaturated carboxylate groups of the following general formulae (I), (II) and (III)

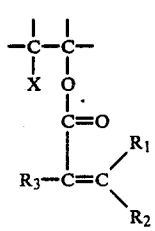

(I)

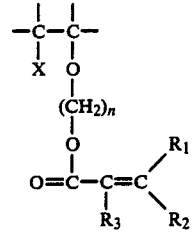

(II)

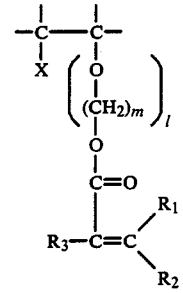

(III)

in which X represents a halogen selected from Cl, Br and I, $R_1$, $R_2$ and $R_3$ independently represents a hydrogen atom or a hydrocarbon residue having from 1 to 10 carbon atoms, n is an integer of 2 to 5, and m is an integer of 1 to 4, and l is an integer of 1 to 30. The component (B) is a polymerizable vinyl group-bearing material containing essentially an acrylic and/or methacrylic acid. The component (C) is a thermoplastic resin and the component (D) is a catalyst as set forth above. When the component (C) thermoplastic resin is selected to have good miscibility with the compounds (A) and (B), the resulting compound or composition has an improved tackiness and can be remarkably improved in peel bond strength and shear bond strength and have good heat aging resistance.

DETAILED DESCRIPTION AND PREFERRED EMBODIMENTS OF THE INVENTION

The component (A) used in the adhesive compound of the invention is prepared according to the process described in Japanese Patent Publication No. 53-6198. More particularly, the polymers (component A) having, in the molecule thereof, α,β-unsaturated carboxylate groups of the following general formulae (I), (II) and (III)

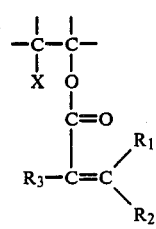

(I)

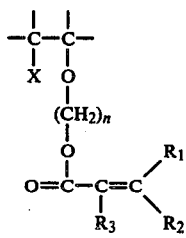

(II)

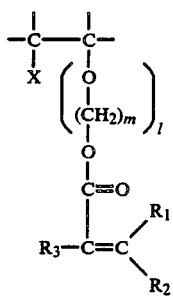

(III)

in which X, $R_1$, $R_2$, $R_3$, l, m and n have, respectively, the same meanings as defined above, can be prepared as follows. A starting polymer having carbon-carbon unsaturated double bonds is reacted with at least one polymerizable unsaturated monomer of the following general formula (i), (ii) or (iii)

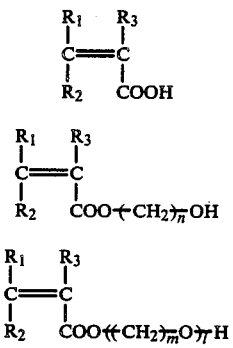

in which $R_1$, $R_2$, $R_3$, l, n and m have, respectively, the same meanings as set forth above. The reaction is carried out in the presence of an alkyl hypohalite or an N-haloamide compound of the general formula,

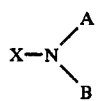

in which X represents a halogen atom, "A" represents a carboxylic residue, a sulfonic residue or a monoester of carbonic acid, and "B" represents a hydrogen atom, a halogen atom or a carboxylic residue.

The starting polymers used for reaction with the polymerizable unsaturated monomer may be a wide variety of materials having C—C double bonds in the backbone chain or side chains, and include, for example, natural rubber, polyisoprene, polybutadiene, polychloroprene, butadienestyrene copolymers, butadieneacrylonitrile copolymers, butadiene-acrylic acid copolymers, butadiene-methacrylic acid copolymers, butadiene-methylacrylate copolymers, butadiene-methylmethacrylate copolymers, butadienevinylpyridine-styrene copolymers, ethylene-propylenecyclopentadiene copolymers, ethylene-propylene-5-ethylidene-2-norbornene copolymers, ethylene-propylene1,4-hexadiene copolymers, isobutylene-isoprene copolymers, halogenates or highly unsaturated materials of isobutyleneisoprene copolymers, and norbornene ring-opened polymers. These polymers may be used singly or in combination.

The molecular weight of the polymer of component (A) is not restricted, and may be suitably selected depending on the purpose. Preferably, polymers having a molecular weight of no less than 500 are used.

It is preferable to control an introduction rate of $\alpha,\beta$-unsaturated carboxylate groups into the polymer of component (A) to from 1/100 to 1/30000 mole equivalent/unit weight of the polymer in order to develop high performances as the adhesive composition. If the ratio is higher than 1/100 mole equivalent, the stability of the polymer would be lower and would at times result in a gelling tendency. On the other hand, if it is lower than 1/30000 mole equivalent, the introduction of the $\alpha,\beta$-unsaturated carboxylate groups into the polymer would become less significant, and it might not be possible to obtain satisfactory mechanical or physical properties essential for the development of a high performance of the adhesives. The introduction ratio of 1/200 to 1/20000 mole equivalent is particularly favorable.

The reaction of the above-mentioend starting polymer with the polymerizable unsaturated monomer can be effected in the presence of (B) component in a reactor if the reaction mixture is in the form of a solution or by mechanical kneading, such as with a roller mill under a high shear strength if the reaction mixture is in the form of a paste having considerable viscosity.

The content of (A) component is preferred to be 5 to 95 parts by weight (hereinafter referred to simply as part) per 100 parts of (A) and (B) components. If the content is less than 5 parts, the peel bond strength deteriorates, with the fatigue resistance being insufficient in some case. Amounts larger than 95 parts may result in a lowering of the shear bond strength.

As (B) component of the adhesive compounds of the present invention, there are used polymerizable monomers containing at least one acrylic and/or methacrylic acid as the essential component. Examples of the polymerizable monomers include methyl methacrylate, ethyl methacrylate, acrylonitrile, methacrylonitrile, ethyl acrylate, butyl methacrylate, cyclohexyl methacrylate, hexyl methacrylate, 2-ethylhexylmethacrylate, lauryl methacrylate, butyl acrylate, cyclohexyl acrylate, hexyl acrylate, 2-ethylhexyl acrylate, trimethadecyl acrylate, tetrahydrofurfuryl methacrylate, dimethyl-aminoethyl methacrylate, diethylaminoethyl methacrylate, stearyl methacrylate, glycidyl methacrylate, ethyl dimethacrylate, 1,3-butyl dimethacrylate, benzyl methacrylate, 2-hydroxypropyl methacrylate, trimethylolpropane trimethacrylate, tetramethacrylic erythritol, t-butyl methacrylate, isobutyl methacrylate, 2-hydroxyethyl methacrylate, triethylene glycol dimethacrylate, tetraethylene glycol dimethacrylate, trimethylpropane triacrylate, condensates of methacrylic acid and/or acrylic acid and bisphenol A diglycidyl, diisocyanates, epichlorhydrin, etc. styrene and its derivatives such as $\alpha$-methyl styrene, $\beta$-methyl styrene, divinylbenzene, etc. vinyl acetate, vinylpyridine, acrylamide, etc. In consideration of the compatibility with (A)

component, properties of the adhesive compounds, etc., one or more monmers are suitably selected in practice.

Further, there may also be used, instead of or with the above-said monomer, the materials which are not called monomers, but which have polymerizable vinyl groups in the molecules. Examples of these materials are liquid and solid rubbers having acrylic or methacrylic groups at the terminal or at side chains, acrylates or methacrylates whose principal chain is a polyester or polyether, urethane acrylates or urethane methacrylates whose principal chain is a polyester or polyether. These materials have polymerizable vinyl groups on the molecule thereof and can function as the monomer in the adhesive.

It should be noted that (B) component essentially consists of the above-said monomer and/or material, and acrylic and/or methacrylic acid.

It is preferable for the content of (B) component to be 5 to 95 parts of (B) component in 100 parts of (A) and (B) components. If the content is less than 5 parts, the shear bond strength may become insufficient. On the other hand, the peel bond strength and fatigue resistance may lower if the content is larger than 95 parts.

It is desirable that the content of acrylic acid and/or methacrylic acid not be less than 5 parts in 100 parts of (A) and (B) components. If its content is less than 5 parts, not only are the shear bond strength and peel bond strength are insufficient, but also the water and moisture resistances of the adhesive joint may at times to lowered.

As (C) component of the present invention, thermoplastic resins which give tackiness to the adhesive compound are preferably used. Examples of such resins include synthetic resins such as petroleum hydrocarbon resins, phenolic resins and xylene resins, and natural resins such as rosins, derivatives of rosins, terpene resins, etc. In order to ensure a high performance of the adhesive, resins preferably used as (C) component should not cause phase separation from the mixture of (A) and (B) components. Most preferably, resins which have good compatibility with the mixture of (A) and (B) components and which are soluble in the mixture are used.

The content of (C) component is preferably in the range of 1 to 300 parts per 100 parts of (A) and (B) components. By using (C) component in the above range, an initial adhesion performance is improved, and a heat aging resistance is also greatly improved. In contrast, when the content of (C) component is less than 1 part, the heat aging resistance and adhesion performances are not always sufficiently improved. On the other hand, if the content is larger than 300 parts, mechanical and physical properties so lower that intended adhesion performances may not be obtained.

(C) component not only contributes to the improvement of the adhesion performance, but also acts as a tackifier in a paste type adhesive of the present invention having viscosity ranges from 10,000 to several millions cps.

(D) component of the present invention is a curing catalyst, and known organic peroxide polymerization catalysts are preferably used. Examples of the peroxides include ketone peroxides, such as methyl ethyl ketone peroxide, hydroperoxides such as t-butyl hydroperoxide, cumene hydroperoxide and the like, dialkyl peroxides such as dicumyl peroxide, diacyl peroxides such as acetylperoxide, peroxyesters such as t-butylperoxide benzoate, t-butylpermaleic acid and the like. Particularly, when the adhesive compound of the present invention is used as a heat curing adhesive, peroxides which have relatively high decomposition temperatures and not extremely high activation energy for the decomposition, e.g. t-butyl permaleic acid, are conveniently used. Furthermore, these organic peroxides decompose in the adhesive compound when heated, and generate radicals, causing curing by polymerization. As known in the art, curing is possible at room-temperature by the use of a decomposition aid. Suitable decomposition aids used in combination with the organic peroxides include, for example, tertiary amine compounds such as N,N-dimethylaniline, N,N-dimethyltoluidine, N,N-diethylaniline, guanidine and N,N-diisopropyl(p-toluidine), naphthenates such as of cobalt, nickel, manganese, iron and the like, iron propionate, copper octenoate, iron hexonate, aldehyde-amine condensates, tetrahydroquinoline, vanadium compounds, acetylacetone, acetoacetic acid ester, dimedone and the like. Using one or combinations of two or more of these compounds, roomtemperature cure adhesive compounds can be formulated.

These decomposition aids can be used in two ways. In one way, the aid can be used as a primer with or without dissolution in suitable solvents, and is applied onto one or both of adherends. Alternatively, the adhesive compound is divided into halves. An organic peroxide which acts as a radical releasing agent is added to one half, and a decomposition aid is added to the other half. At the time of the application the two halves are mixed.

Aside from the peroxides, photosensitizers may also be used solely or together with organic peroxides as curing catalysts of (D) component. Examples of the photosensitizers include benzoin, benzophenone, benzoin ethyl ether, benzoin isopropyl ether, benzoin isobutyl ether, dibenzyl, 5-nitroacenaphthene, hexachlorocyclopentadiene, p-nitrodiphenyl, p-nitroaniline, 2,4,6-trinitroaniline, 1,2-benzanthraquinone, 3-methyl-1,3-diaza-1,9-benzaslone, benzantrone, 1-naphthoaldehyde, anthraquinone, camphorquinone, biacetyl, 2,3-pentadion and the like.

The adhesive compounds formulated with these photosensitizers are polymerized and cured by irradiation of sunlight, UV light or electronic beam. The combination with organic peroxides makes it possible to polymerize and cure by heating.

It is preferable to add 0.01 to 5 parts of (D) component, whichever organic peroxide or photosensitizer, per 100 parts in total of (A) and (B) components.

In addition, it is possible to add a small amount of polymerization inhibitors so as to improve the storage stability, i.e. the so-called shelf life, of the adhesive compounds of the present invention. Examples of the polymerization inhibitor are quinones such as p-benzoquinone and p-quinonedioxime, phenols such as hydroquinone monomethyl ether and 2,6-di-t-butyl p-cresol, and polyphenols such as 2,5-di-t-butylhydroquinone and the like.

The adhesive composition of the present invention may further comprise known silane coupling agents for improvement of adhesion to various types of adherends. In addition, suitable amounts of silica, carbon black, fillers such as clay, mica and calcium carbonate, colorants, and organic and inorganic short fibers may be added for the purpose of reinforcement, coloring and filling.

The adhesive compositions of the present invention cover a variety of states including a solution of low visicosity and a paste of high viscosity. All adhesive compositions can be impregnated in organic and inorganic woven and unwoven fabrics. A fabric acts as a reinforcing layer after curing in the case of solution type adhesives and not only serves to improve the handling property but also acts as a reinforcing layer after curing in the case of paste type adhesives.

The following examples and comparative examples are given by way of illustration, and this invention is not to be considered as limited only to the followings.

EXAMPLES 1-4 AND COMPARATIVE EXAMPLE 1

4.34 g of t-butyl hypochlorite was added to a solution in which 20 g of Solprene 414 (Radial Block SBR, by Asahi Chemical Industrial Co., Ltd.) was thoroughly dissolved in 30 g of methacrylic acid and 50 g of methyl methacrylate, and then the solution was stirred for 3 hrs. at room temperature to introduce α,β-unsaturated carboxylate group to Solprene 414.

Thereafter, an adhesive compound of Example 1 using the thus obtained solution was prepared.

The other adhesive compounds of Examples 2 to 4 and Comparative Example 1 were prepared in almost the same manner as the adhesive compound of Example 1. It should be noted that the adhesive compound of Comparative Example 1 does not contain (C) component (thermoplastic resin).

Table 1 shows the formulation of the adhesive compounds. The content of each component is indicated by weight percent of each component to 100% by weight of the total amount of Solprene 414, methacrylic acid and methyl methacrylate.

TABLE 1

|  | Examples | | | | Comparative Example |
|---|---|---|---|---|---|
|  | 1 | 2 | 3 | 4 | 1 |
| Solprene 414 | 20 | 20 | 20 | 20 | 20 |
| Methacrylic acid | 30 | 30 | 30 | 30 | 30 |
| Methyl methacrylate | 50 | 50 | 50 | 35 | 50 |
| t-butylhypochlorite | 4.34 | 4.34 | 4.34 | 4.34 | 4.34 |
| TE 2000° | 0 | 0 | 0 | 15 | 0 |
| p-benzoquinone | 0.003 | 0.003 | 0.003 | 0.003 | 0.003 |
| Arkon M-100* | 10 | 20 | 20 | 20 | 0 |
| Perbutyl MA° | 2 | 2 | 0 | 2 | 2 |
| Percumyl H° | 0 | 0 | 1 | 0 | 0 |
| Introduction rate** | 1/500 | 1/500 | 1/500 | 1/500 | 1/500 |

*TE 2000: liquid polybutadiene (Nippon Soda Co., Ltd.)
Arkon M-100: hydrocarbon resin (Arakawa Chemical Ind.)
Perbutyl MA: t-butyl permaleic acid (Nippon Oil and Fat Co., Ltd.)
Percumyl H: Cumen hydroperoxide (Nippon Oil and Fat Co., Ltd.)
**Introduction rate shows that of α,β-unsaturated carboxylate group into the polymer of component (A) [mole equivalent per unit weight of the polymer].

Next, the adhesive compounds were subjected to determination of adhesive properties (shear bond strength and peel bond strength).

Test specimens for the determination of shear bond strength of Examples 1, 2 and 4 and Comparative Example 1 were obtained by applying each formulated adhesive compound to an adhesion area of 25 mm in width × 12.5 mm in length between 2 sheets of a cold-rolled steel plate (SS-41, 1.0 mm in thickness × 25 mm in width × 100 mm in length) and thermally curing at 130° C. for 30 min. by use of a hot press. The thickness of the adhesive was adjusted to 0.05 to 0.10 mm by use of a spacer.

In Example 3, the surface of the above test specimens was precoated with a primer comprising a butyl aldehyde aniline condensate before the application of the formulated adhesive on the area of 25 mm in width × 12.5 mm in length. Then the specimens were put together and the adhesive joint was kept with a paper clip, followed by allowing to stand for 24 hrs. at room temperature (20° C.) for curing. The thickness of the adhesive was adjusted to 0.05 to 0.10 mm by use of a spacer.

The initial shear bond strength was determined at room temperature using the Instron tester with a cross head speed of 5 mm/min. Moreover, the test specimens were made in the same way as described above were allowed to stand for 500 hrs. at 120° C. and subsequently cooled to room temperature (20° C.), followed by measurement of the shear bond strength after heat aging.

Test specimens for the peel bond strength were prepared using a cold-rolled steel plate (SS-41) in accordance with ISO 4578 (peel test with floating roller) and the peel bond strength was determined at room temperature (20° C.) at a cross head speed of 100 mm/min. in accordance with a method of ISO 4578. The conditions for the preparation of test specimens were the same as those for the shear bond strength.

Table 2 shows the results of the shear bond strength and peel bond strength.

TABLE 2

Adherend: 1.0 mm thickness of SS-41

|  |  | Examples | | | | Comparative Example |
|---|---|---|---|---|---|---|
|  |  | 1 | 2 | 3 | 4 | 1 |
| Shear bond strength | initial (kg/cm²) | 190 *(100%) | 195 (100%) | 190 (100%) | 215 (100%) | 180 (100%) |
|  | after heat aging (kg/cm²) | 167 *(88%) | 181 (93%) | 181 (95%) | 200 (93%) | 126 (70%) |
| Peel bond strength (kg/25 mm) |  | 13.0 | 15.5 | 16.0 | 18.5 | 7.5 |

*Figures in the brackets indicate relative strengths after aging to initial strengths taken as 100.

From the results shown in Table 2, it will be seen that the adhesive compounds of the invention are excellent in the initial shear bond strength and heat aging resistance.

EXAMPLES 5 AND 6 AND COMPARATIVE EXAMPLE 2

2.17 g of t-butylhypochlorite was added to a solution of 10 g of RB 810 (1,2-polybutadiene of Nippon Synthetic Rubber Co., Ltd.) dissolved thoroughly in 30 g of methacrylic acid and 60 g of methyl methacrylate, followed by stirring for 6 hrs. at room temperature to complete the reaction.

Thereafter, adhesive compounds based on this solution (Examples 5 and 6, and Comparative Example 2) were prepared. Table 3 shows the formulations indicated in the same way as in Table 1. The adhesive compound of Comparative Example 2 does not contain (C) component (thermoplastic resin).

Then the adhesive properties of the adhesive compounds were determined. The preparation of test specimens and the evaluation of the adhesive properties were made in the same way as in Examples 1, 2 and 4.

The results of the tests on the shear bond strength and the peel bond strength are shown in Table 4.

TABLE 3

|  | Examples | | Comparative Example |
|---|---|---|---|
|  | 5 | 6 | 2 |
| RB 810 | 10 | 10 | 10 |
| methacrylic acid | 30 | 30 | 30 |
| methyl methacrylate | 60 | 60 | 60 |
| t-butylhypochlorite | 2.17 | 2.17 | 2.17 |
| p-benzoquinone | 0.003 | 0.003 | 0.003 |
| Arkon M-100 | 10 | 20 | 0 |
| Perbutyl MA | 2 | 2 | 2 |
| Introduction rate | 1/500 | 1/500 | 1/500 |

TABLE 4

Adherends: 1.0 mm thickness of SS-41

|  | Examples | | Comparative Example |
|---|---|---|---|
|  | 5 | 6 | 2 |
| Shear bond strength (kg/cm$^2$) | 160 | 170 | 115 |
| Peel bond strength (kg/25 mm) | 8.5 | 9.0 | 4.5 |

Table 4 reveals that the adhesive compounds of the invention in which 1,2-polybutadiene is used as rubber-like high molecular weight compound have high shear bond strength and peel bond strength.

EXAMPLES 7-9 AND COMPARATIVE EXAMPLE 3

40 g of BR01 (polybutadiene rubber of Nippon Synthetic Rubber Co., Ltd.) was added to a mixture of 30 g of methacrylic acid and 30 g of methyl methacrylate, and allowed to stand for a whole day and night to swell. Then the mixture was kneaded homogeneously by a roll mill. 1.45 g of t-butylhypochlorite was dropped into the mixture, followed by kneading for 5 min. and allowing to stand for a whole day and night at room temperature in a container.

Thereafter, adhesive compounds formulated using the resulting compound (Examples 7-9, Comparative Example 3) were prepared. The formulations are given in Table 5 in the same way as in Table 1. All the components in Table 5 were formulated while kneading with a roller mill. The adhesive compound of Comparative Example 3 does not contain (C) component (thermoplastic resin).

Then the adhesive properties of the adhesive compounds were determined. The preparation of test specimens and the evaluation of the adhesive properties were made in the same way as in Examples 1, 2 and 4 except that the adherend material was changed to SS-41 steel with a thickness of 0.8 mm.

The results are shown in Table 6.

TABLE 5

|  | Examples | | | Comparative Example |
|---|---|---|---|---|
|  | 7 | 8 | 9 | 3 |
| BR01 | 40 | 40 | 40 | 40 |
| Methacrylic acid | 30 | 30 | 30 | 30 |
| Methyl methacrylate | 30 | 30 | 30 | 30 |
| t-butyl hypochlorite | 1.45 | 1.45 | 1.45 | 1.45 |
| p-benzoquinone | 0.01 | 0.01 | 0.01 | 0.01 |
| Arkon M-100 | 10 | 20 | 40 | 0 |
| Perbutyl MA | 1 | 1 | 1 | 1 |
| Introduction rate | 1/3000 | 1/3000 | 1/3000 | 1/3000 |

TABLE 6

Adherends: 0.8 mm thickness of SS-41

|  |  | Examples | | | Comparative Example |
|---|---|---|---|---|---|
|  |  | 7 | 8 | 9 | 3 |
| Shear bond strength | initial (kg/cm$^2$) | 200 (100%) | 200 (100%) | 200 (100%) | 160 (100%) |
|  | after heat aging (kg/cm$^2$) | 180 (90%) | 184 (92%) | 186 (93%) | 120 (75%) |
| Peel bond strength (kg/25 mm) |  | 27.5 | 43 | 39 | 18.5 |

The results of Table 6 reveals that the adhesive compounds of the present invention, in which polybutadiene rubber was formulated as the rubber-like polymer, give high shear bond strength and have a good heat aging resistance.

EXAMPLES 10-14

In order that adhesive compounds which were comprised of Solprene 414 or BR01, methacrylic acid and methyl methacrylate similar to the compounds of Examples 1-4 and 7-9 were made photocurable, adhesive compounds using a benzoinisopropylether catalyst (Examples 10-14) were prepared. The formulations of the compounds are given in Table 7 similar to Tables 1 and 5.

Then the adhesive compounds were subjected to determination of adhesive properties by the following method.

Glass plates with a dimension of 5 mm in thickness × 25 mm in width × 40 mm in length were employed as the adherends, and the adhesive compounds were each applied to an area of 25 mm in width × 3 mm in length. The adhesive was cured by irradiation of a high voltage mercury lamp for 10 secs. at a distance of 150 mm from the adhesive joint. The irradiation strength was 80 mW/cm$^2$ at a wave length of 365 nm.

The shear bond strength was determined by a compressive shear test which was made by the use of the Instron tester at room temperature (20° C.) at a cross head speed of 5 mm/min.

The results of the shear bond strength are shown in Table 8.

TABLE 7

|  | Examples | | | | |
|---|---|---|---|---|---|
|  | 10 | 11 | 12 | 13 | 14 |
| BR01 | 40 | 40 | 40 |  |  |
| Solprene 414 |  |  |  | 20 | 20 |
| Methacrylic acid | 30 | 30 | 30 | 30 | 30 |
| Methyl methacrylate | 30 | 30 | 30 | 50 | 50 |
| t-butylhypochlorite | 1.45 | 1.45 | 1.45 | 4.34 | 4.34 |
| γ-MS* | 0.2 | 0.2 | 0.2 | 0.2 | 0.2 |
| p-benzoquinone | 0.01 | 0.01 | 0.01 | 0.003 | 0.003 |
| Arkon M-100 | 10 | 20 | 40 | 10 | 20 |
| Benzoinisopropyl ether | 1 | 1 | 1 | 1 | 1 |
| Introduction rate | 1/3000 | 1/3000 | 1/3000 | 1/500 | 1/500 |

*γ-MS: silane coupling agent of Shin'etsu Chemical Co., Ltd. (γ-methacryloxy propyl trimethoxy silane)

\* γ-MS: silane coupling agent of Shin'etsu Chemical Co., Ltd. (γ-methacryloxy propyl trimethoxy silane)

TABLE 8

Adherends: 5 mm thickness of glass

| | Examples | | | | |
|---|---|---|---|---|---|
| | 10 | 11 | 12 | 13 | 14 |
| Shear bond strength (kg/cm²) | 200 min. (glass fractured) | 200 min. (glass fractured) | 200 min. (glass fractured) | 200 min. (glass fractured) | 200 min. (glass fractured) |

From the Table 8, it will be appreciated that the adhesive compositions of the present invention can be applied as a photo-curable type, and can be suitably used for the adhesion of inorganic substrates.

EXAMPLES 15–26, COMPARATIVE EXAMPLE 4

Adhesive compounds of Examples 15–26 and Comparative Example 4 were prepared in the same manner as in Examples 7–9. It should be noted that the adhesive compounds of Examples 15–26 were prepared by changing the introduction rate and the kind of resin to be added, whose formulations are given in Table 9 similar to the case of Examples 7–9. Commercially available SGA adhesive was used in Comparative Example 4.

Then the adhesive properties of the adhesive compounds were determined. Preparation of test specimens and determination of shear bond strength as well as the determination of the peel bond strength were made in the same way as in Examples 1, 2 and 4 except that cold-rolled SS-41 steel plates with thicknesses of 2.3 mm and 0.8 mm, respectively, were used as the adherends.

Table 9 shows the results of the shear bond strength and peel bond strength.

The results of Table 9 demonstrate that the adhesive compounds of this invention have high shear bond strengths in a wide range of introduction rate (Examples 15–18). It will also be found from Examples 16, 19 and 20 and the foregoing Examples 7 and 8 that the adhesive compounds of the invention have high shear bond strengths even if the formulation ratio of rubber-like polymer/monomer and the concentration of resins are changed.

Besides, it will be seen that various thermoplastic resins may be suitably formulated in the adhesive compositions of the present invention. It will be understood that if a suitable polymerizable monomer is selected as a component of the adhesive compound, high shear bond strengths can be obtained as is apparent from the results of Examples 25 and 26.

TABLE 9

| | Examples | | | | | | |
|---|---|---|---|---|---|---|---|
| | 15 | 16 | 17 | 18 | 19 | 20 | 21 |
| BR01 | 40 | 40 | 40 | 40 | 30 | 50 | 40 |
| Methacrylic acid | 30 | 30 | 30 | 30 | 30 | 30 | 30 |
| Methyl methacrylate | 30 | 30 | 30 | 30 | 40 | 20 | 30 |
| t-butyl methacrylate | | | | | | | |
| Lauryl methacrylate | | | | | | | |
| t-butylhypochlorite | 2.89 | 1.45 | 0.87 | 0.43 | 1.09 | 1.81 | 1.45 |
| p-benzoquinone | 0.01 | 0.01 | 0.01 | 0.01 | 0.01 | 0.01 | 0.01 |
| Arkon M-100 | 40 | 40 | 40 | 40 | 40 | 40 | 30 |
| YS resin TO-115* | | | | | | | |
| YS resin A-125* | | | | | | | |
| YS resin Px 900* | | | | | | | |
| Perbutyl MA | 1 | 1 | 1 | 1 | 1 | 1 | 1 |
| Introduction rate | 1/1500 | 1/3000 | 1/5000 | 1/10000 | 1/3000 | 1/3000 | 1/3000 |
| Shear bond strength (kg/cm²) | | | | | | | |
| 2.3ᶠ SS-41 | 321 | 275 | 180 | 150 | 207 | 200 | 290 |
| 0.8ᶠ SS-41 | 170 | 200 | 160 | 130 | 178 | 190 | 190 |
| Peel bond strength (kg/25 mm) | 48 | 39 | 39 | 30.5 | 33.5 | 43 | 43.5 |

| | Examples | | | | | Comparative Example |
|---|---|---|---|---|---|---|
| | 22 | 23 | 24 | 25 | 26 | 4 |
| BR01 | 40 | 40 | 40 | 40 | 40 | commercially available SGA |
| Methacrylic acid | 30 | 30 | 30 | 30 | 30 | |
| Methyl methacrylate | 30 | 30 | 30 | | | |
| t-butyl methacrylate | | | | 30 | | |
| Lauryl methacrylate | | | | | 30 | |
| t-butylhypochlorite | 1.45 | 1.45 | 1.45 | 1.45 | 1.45 | |
| p-benzoquinone | 0.01 | 0.01 | 0.01 | 0.01 | 0.01 | |
| Arkon M-100 | | | | 40 | 40 | |
| YS resin TO-115* | 30 | | | | | |
| YS resin A-125* | | 30 | | | | |
| YS resin Px 900* | | | 30 | | | |
| Perbutyl MA | 1 | 1 | 1 | 1 | 1 | |
| Introduction rate | 1/3000 | 1/3000 | 1/3000 | 1/3000 | 1/3000 | |
| Shear bond strength (kg/cm²) | | | | | | |
| 2.3ᶠ SS-41 | 310 | 217 | 290 | 250 | 220 | 240 |
| 0.8ᶠ SS-41 | 200 | 183 | 195 | 190 | 180 | 140 |
| Peel bond strength (kg/25 mm) | 50 | 52.5 | 40.5 | 37 | 35 | 7 |

*YS resin TO-115: aromatic-modified terpene resin (Yasuhara Oil and Fat Co., Ltd.)
YS resin A-125: α-penene resin (Yasuhara Oil and Fat Co., Ltd.)
YS resin Px 900: Terpene resin (Yasuhara Oil and Fat Co., Ltd.)

What is claimed is:
1. An adhesive composition of a cross-linking type comprising

(A) at least one polymer, having in the molecule thereof, at least one $\alpha,\beta$-unsaturated carboxylate group of the following formula (I), (II) or (III)

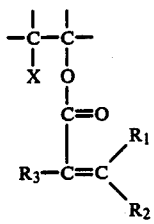  (I)

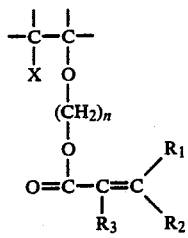  (II)

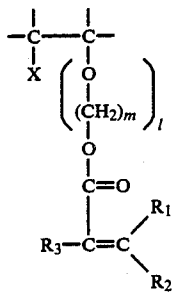  (III)

in which x represents a halogen atoms selected from the group consisting of Cl, Br and I, $R_1$, $R_2$ and $R_3$ independently represents a hydrogen atom or a hydrocarbon residue having 1 to 10 carbon atoms, n is an integer of 2-5, m is an integer of 1-4 and l is an integer of 1-30, wherein the $\alpha,\beta$-unsaturated carboxylate groups having been introduced into the polymer at an introduction rate of from 1/100 to 1/30000 mole equivalent/unit weight of the polymer, (B) a polymerizable vinyl group-bearing material containing an acrylic acid, methacrylic acid or a mixture of both as an essential component, (C) a thermoplastic resin selected from petroleum hydrocarbon resin, phenolic resin, xylene resin, rosins or terpene resin, and (D) a curing catalyst, and wherein:
  the content of (A) is 5 to 95 parts by weight in 100 parts of (A) and (B),
  the content of (B) is 5 to 95 parts in 100 parts of (A) and (B),
  the content of (C) is 1 to 300 parts in 100 parts of (A) and (B),
  the content of (D) is 0.01 to 5 parts in 100 parts of (A) and (B),
  the content of acrylic acid, methacrylic acid or a mixture of both is not less than 5 parts in 100 parts of (A) and (B).

2. The adhesive composition according to claim 1 wherein the introduction rate is from 1/200 to 1/20000 made equivalent/unit weight of the polymer.

3. The adhesive composition according to claim 1 wherein (C) has good compatibility with the mixture of (A) and (B).

4. The adhesive composition according to claim 1 wherein (D) is an organic peroxide, a photosensitizer or a mixture of both.

5. The adhesive composition according to claim 1 which contains a small amount of a polymerization inhibitor.

6. The adhesive composition according to claim 1 which contains a silane coupling agent.

7. The adhesive composition according to claim 1 which contains a filler, a colorant and/or a reinforcement agent.

* * * * *